(12) United States Patent
Curhan et al.

(10) Patent No.: US 10,668,629 B2
(45) Date of Patent: Jun. 2, 2020

(54) STRUCTURE FOR A ROBOTIC END EFFECTOR

(71) Applicant: Soft Robotics, Inc., Cambridge, MA (US)

(72) Inventors: Jeffrey Curhan, Warwick, RI (US); Thomas Womersley, Newton, MA (US)

(73) Assignee: Soft Robotics Inc., Cambridge, MA (US)

( * ) Notice: Subject to any disclaimer, the term of this patent is extended or adjusted under 35 U.S.C. 154(b) by 0 days.

(21) Appl. No.: 15/967,210

(22) Filed: Apr. 30, 2018

(65) Prior Publication Data

US 2018/0311829 A1 Nov. 1, 2018

Related U.S. Application Data

(60) Provisional application No. 62/644,690, filed on Mar. 19, 2018, provisional application No. 62/643,859, (Continued)

(51) Int. Cl.
  *B25J 15/00* (2006.01)
  *B25J 15/12* (2006.01)
  (Continued)

(52) U.S. Cl.
  CPC .......... *B25J 15/0033* (2013.01); *B25J 9/142* (2013.01); *B25J 15/0023* (2013.01); *B25J 15/12* (2013.01); *F15B 15/103* (2013.01); *Y10S 901/37* (2013.01)

(58) Field of Classification Search
  CPC .............. B25J 15/0009; B25J 15/0023; B25J 15/0033; B25J 15/10; B25J 15/103;
  (Continued)

(56) References Cited

U.S. PATENT DOCUMENTS 3,343,864 A * 9/1967 Baer .................... B25J 15/0009
  294/119.3
4,028,926 A * 6/1977 Olesovsky ............... B21D 7/16
  294/106

(Continued)

FOREIGN PATENT DOCUMENTS

| DE | 102015218523 A1 | 3/2017 |
|---|---|---|
| EP | 1974872 A1 | 10/2008 |
| JP | 2013166215 A | 8/2013 |

OTHER PUBLICATIONS

International Search Report and Written Opinion of PCT/US2018/030260; dated Aug. 6, 2018, 12 pages.

*Primary Examiner* — Dean J Kramer

(57) ABSTRACT

Various stabilization devices for a robotic end of arm tool, such as a robotic gripper, are described. The stabilization device is provided in a palm area of the end of arm tool and serves as a backstop against which actuators of the end of arm tool can push a compliant or slick target object. The stabilization device may take many any of a variety of shapes, depending on the application. Based on the shape of the stabilization device and the action of the robotic gripper on the target object, the target object can be moved or rotated in a more stable configuration, thus allowing the actuators to apply less force while still maintaining a firm grasp of the object.

14 Claims, 13 Drawing Sheets

Related U.S. Application Data filed on Mar. 16, 2018, provisional application No. 62/492,627, filed on May 1, 2017.

(51) Int. Cl.
*B25J 9/14* (2006.01)
*F15B 15/10* (2006.01)

(58) Field of Classification Search
CPC ........ B25J 15/12; B25J 9/142; B25J 11/0045; Y10S 901/37; Y10S 901/39; F15B 15/103
USPC ................. 294/86.4, 98.1, 103.1, 119.3, 213
See application file for complete search history.

(56) References Cited

U.S. PATENT DOCUMENTS

| | | | | |
|---|---|---|---|---|
| 6,484,601 | B1 * | 11/2002 | Arrichiello | B25J 9/14 |
| | | | | 294/106 |
| 7,370,896 | B2 * | 5/2008 | Anderson | B25J 15/0009 |
| | | | | 294/106 |
| 8,100,451 | B2 * | 1/2012 | Okuda | A61F 2/583 |
| | | | | 294/106 |
| 8,403,387 | B2 * | 3/2013 | Nakasugi | B25J 15/0009 |
| | | | | 269/900 |
| 8,950,795 | B2 * | 2/2015 | Koehler | F03G 7/065 |
| | | | | 294/103.1 |
| 2004/0217612 | A1 * | 11/2004 | Slettedal | E21B 19/14 |
| | | | | 294/202 |
| 2015/0090113 | A1 | 4/2015 | Galloway | |

* cited by examiner

STRUCTURE FOR A ROBOTIC END EFFECTOR

RELATED APPLICATIONS

This application claims priority to: U.S. Provisional Patent Application Ser. No. 62/492,627, entitled "Structure for a Robotic End Effector" and filed on May 1, 2017; and to U.S. Provisional Patent Application Ser. No. 62/643,859, entitled "Keels and a Method for Use" and filed on Mar. 16, 2018; and to U.S. Provisional Patent Application Ser. No. 62/644,690, entitled "New Keels and a Method for Use" and filed on Mar. 19, 2018. The contents of the aforementioned applications are incorporated herein by reference.

BACKGROUND

This disclosure relates generally to the field of robotics, and particularly to novel structures suited to assisting robotic end effectors in grasping particularly compliant objects, such as bagged items.

Conventionally, a robotic end effector may include a number of robotic fingers that grasp a target. Typically, the target is grasped between the fingers and then moved from place to place. When lifting a compliant object, such as an object in a bag or loose wrapping, the object may slip out of the fingers' grasp when lifting the object, accelerating, or decelerating. This problem can be compounded when the bag or wrapping is filled with a product that is capable of shifting within its container; during movement of the object, the shifting of the product can cause forces to be applied unevenly to the bag or wrapping, making it more difficult to securely grasp the target.

Consequently, the objects must be grasped relatively tightly by the fingers to avoid slipping or shifting of the target. This can damage the products contained in the bag or wrapping, and may not guarantee that the objects will not continue to slip or shift.

DETAILED DESCRIPTION OF THE PREFERRED EMBODIMENTS

Figure 1A:
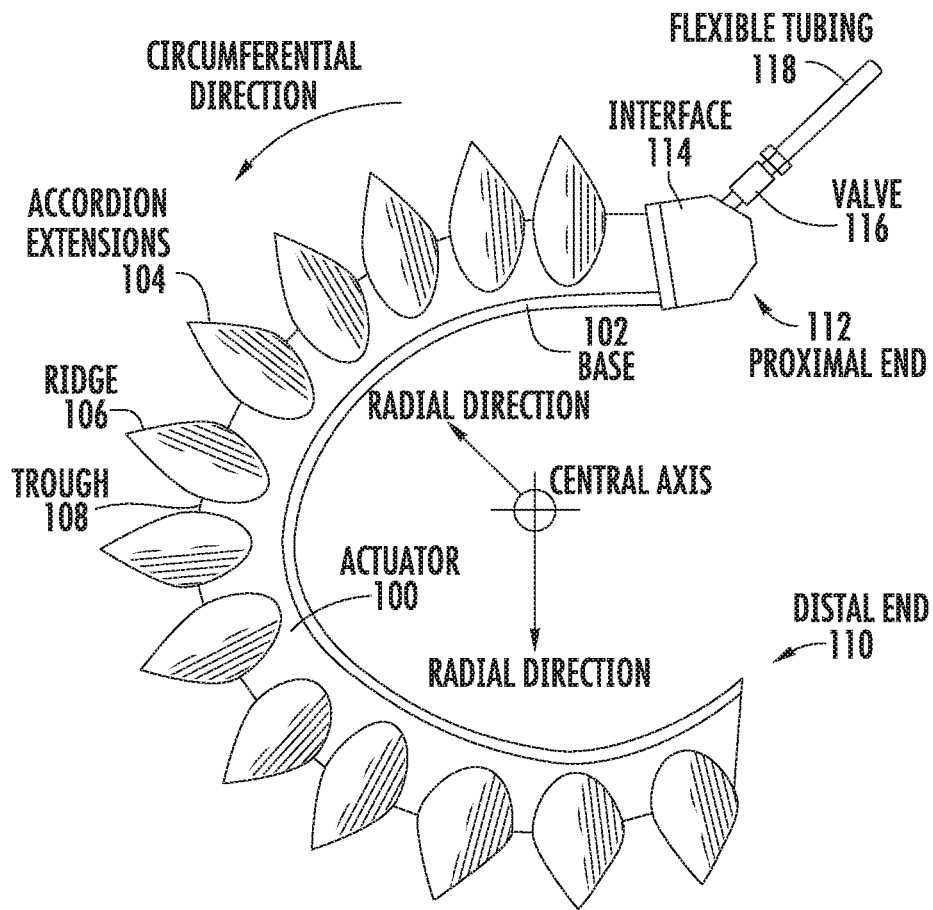
FIGS. 1A-1D depict examples of soft robotic actuators suitable for use with exemplary embodiments described herein.

The present invention will now be described more with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

Background on Soft Robotic Grippers

Conventional robotic actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, coated fabric, or thin walls of plastic arranged in an accordion structure that is configured to unfold, stretch, twist, bend, extend and/or contract under pressure, or other suitable relatively soft materials. As an alternative or in addition to accordion structures, other types or configurations of soft actuators employing elastomeric materials may be utilized. They may be created, for example, by molding or bonding one or more pieces of the elastomeric material into a desired shape. Alternatively or in addition, different pieces of elastomeric material may be thermally bonded, or sewn. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Still further, soft actuators are adaptive, and accordingly a single fixture can grip multiple kinds of objects. Because the outer surfaces of soft actuators are relatively delicate, they can serve in roles such as redirectors for easily bruised or damaged items (e.g., tomatoes) whereas hard fixtures might be limited to manipulating more robust items (e.g., brass valves).

Furthermore, soft actuators will typically not mark the surface being gripped. Typically, when an easily-marked surface (e.g., a veneer) will be gripped by a hard fixture, a protective coating or film may be applied to prevent the part from being marked; this increases the cost of manufacturing.

With a soft actuator, this step may be omitted and the part may be protected without a special coating or film.

Moreover, soft robotic actuators allow for types of motions or combinations of motions (including bending, twisting, extending, and contracting) that can be difficult to achieve with traditional hard robotic actuators.

Figure 1B:
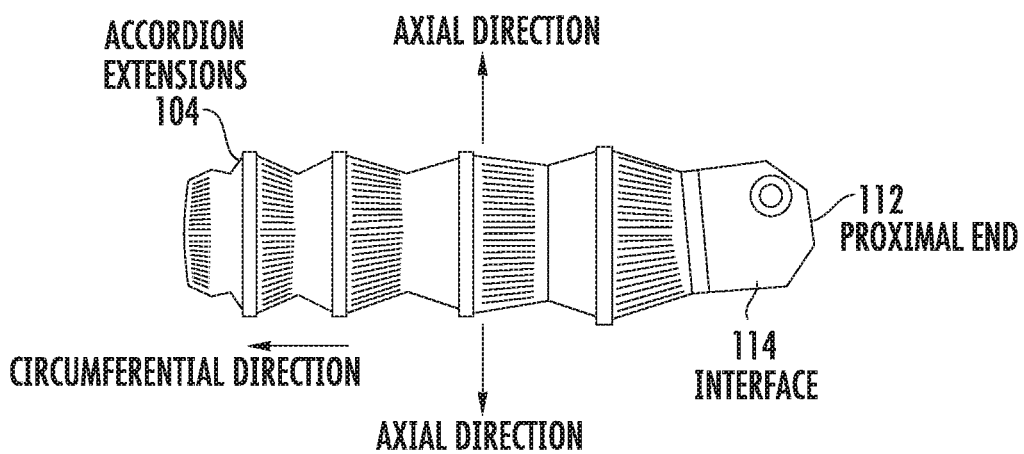
Figure 1C:
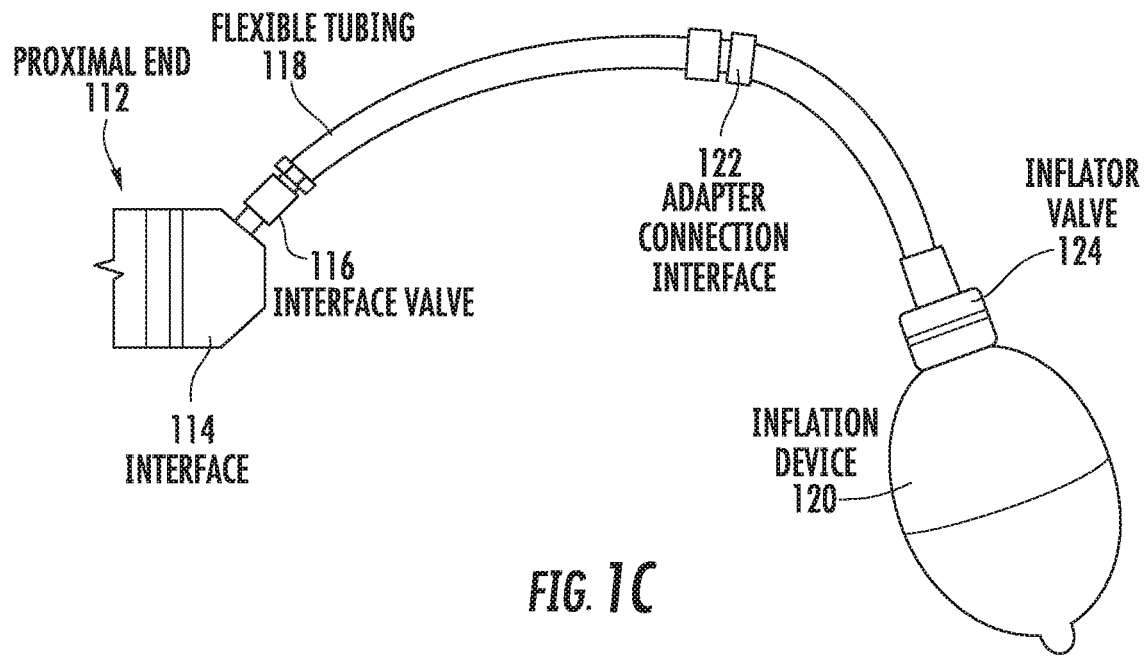
Figure 1D:
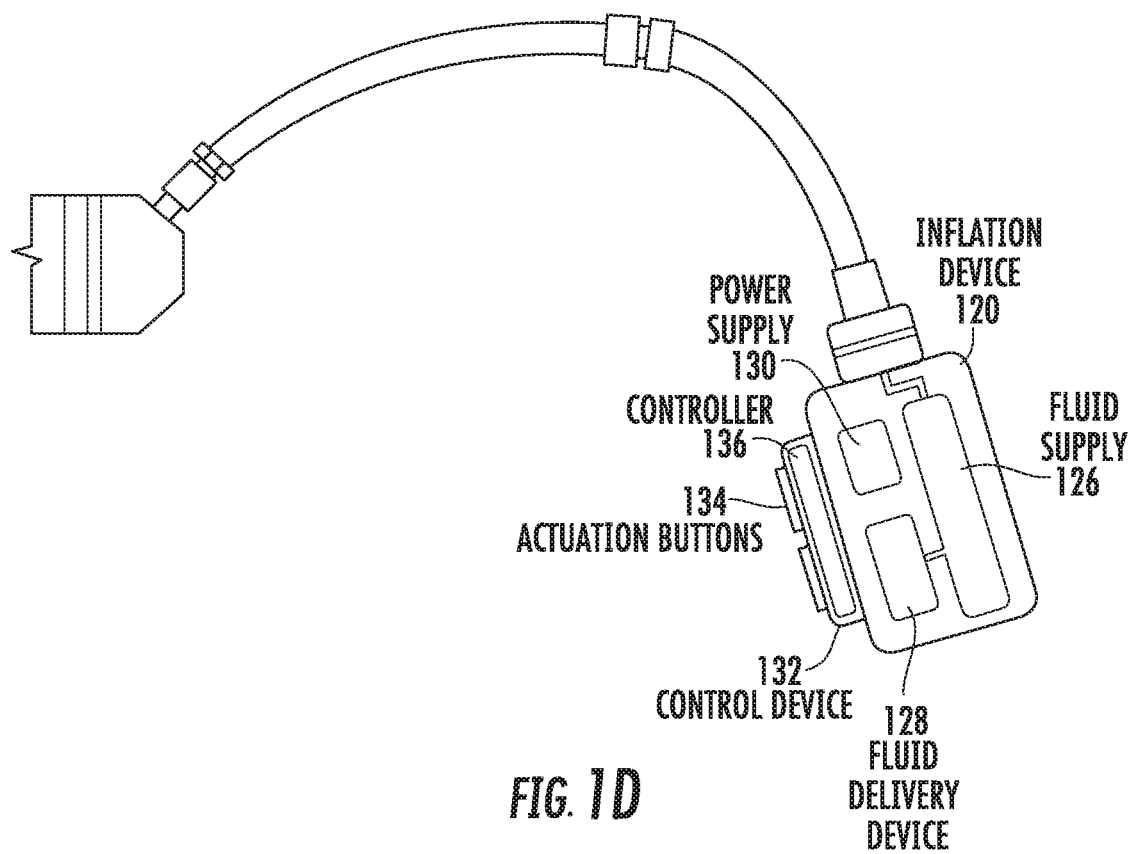

FIGS. 1A-1D depict exemplary soft robotic actuators. More specifically, FIG. 1A depicts a side view of a portion of a soft robotic actuator. FIG. 1B depicts the portion from FIG. 1A from the top. FIG. 1C depicts a side view of a portion of the soft robotic actuator including a pump that may be manipulated by a user. FIG. 1D depicts an alternative embodiment for the portion depicted in FIG. 1C.

An actuator may be a soft robotic actuator 100, as depicted in FIG. 1A, which is inflatable with an inflation fluid such as air, water, or saline. The inflation fluid may be provided via an inflation device 120 through a fluidic connection 118.

The actuator 100 may be in an uninflated state in which a limited amount of inflation fluid is present in the actuator 100 at substantially the same pressure as the ambient environment. The actuator 100 may also be in a fully inflated state in which a predetermined amount of inflation fluid is present in the actuator 100 (the predetermined amount corresponding to a predetermined maximum force to be applied by the actuator 100 or a predetermined maximum pressure applied by the inflation fluid on the actuator 100). The actuator 100 may also be in a full vacuum state, in which all fluid is removed from the actuator 100, or a partial vacuum state, in which some fluid is present in the actuator 100 but at a pressure that is less than the ambient pressure. Furthermore, the actuator 100 may be in a partially inflated state in which the actuator 100 contains less than the predetermined amount of inflation fluid that is present in the fully inflated state, but more than no (or very limited) inflation fluid.

In the inflated state, the actuator 100 may exhibit a tendency to curve around a central axis as shown in FIG. 1A. For ease of discussion, several directions are defined herein. An axial direction passes through the central axis around which the actuator 100 curves, as shown in FIG. 1B. A radial direction extends in a direction perpendicular to the axial direction, in the direction of the radius of the partial circle formed by the inflated actuator 100. A circumferential direction extends along a circumference of the inflated actuator 100.

In the inflated state, the actuator 100 may exert a force in the radial direction along the inner circumferential edge of the actuator 100. For example, the inner side of the distal tip of the actuator 100 exerts a force inward, toward the central axis, which may be leveraged to allow the actuator 100 to grasp an object (potentially in conjunction with one or more additional actuators 100). The soft robotic actuator 100 may remain relatively conformal when inflated, due to the materials used and the general construction of the actuator 100.

The actuator 100 may be made of one or more elastomeric materials that allow for a relatively soft or conformal construction. Depending on the application, the elastomeric materials may be selected from a group of food-safe, biocompatible, or medically safe, FDA-approved materials. The actuator 100 may be manufactured in a Good Manufacturing Process ("GMP")-capable facility.

The actuator 100 may include a base 102 that is substantially flat (although various amendments or appendages may be added to the base 102 in order to improve the actuator's gripping and/or bending capabilities). The base 102 may form a gripping surface that grasps a target object.

The actuator 100 may include one or more accordion extensions 104. The accordion extensions 104 allow the actuator 100 to bend or flex when inflated, and help to define the shape of the actuator 100 when in an inflated state. The accordion extensions 104 include a series of ridges 106 and troughs 108. The size of the accordion extensions 104 and the placement of the ridges 106 and troughs 108 can be varied to obtain different shapes or extension profiles.

Although the exemplary actuator of FIGS. 1A-1D is depicted in a "C" or oval shape when deployed, one of ordinary skill in the art will recognize that the present invention is not so limited. By changing the shape of the body of the actuator 100, or the size, position, or configuration of the accordion extensions 104, different sizes, shapes, and configurations may be achieved. Moreover, varying the amount of inflation fluid provided to the actuator 100 allows the actuator 100 to take on one or more intermediate sizes or shapes between the un-inflated state and the inflated state. Thus, an individual actuator 100 can be scalable in size and shape by varying inflation amount, and an actuator can be further scalable in size and shape by replacing one actuator 100 with another actuator 100 having a different size, shape, or configuration.

The actuator 100 extends from a proximal end 112 to a distal end 110. The proximal end 112 connects to an interface 114. The interface 114 allows the actuator 100 to be releasably coupled to other parts of the actuator. The interface 114 may be made of a medically safe material, such as polyethylene, polypropylene, polycarbonate, polyetheretherketone, acrylonitrile-butadiene-styrene ("ABS"), or acetal homopolymer. The interface 114 may be releasably coupled to one or both of the actuator 100 and the flexible tubing 118. The interface 114 may have a port for connecting to the actuator 100. Different interfaces 114 may have different sizes, numbers, or configurations of actuator ports, in order to accommodate larger or smaller actuators, different numbers of actuators, or actuators in different configurations.

The actuator 100 may be inflated with an inflation fluid supplied from an inflation device 120 through a fluidic connection such as flexible tubing 118. The interface 114 may include or may be attached to a valve 116 for allowing fluid to enter the actuator 100 but preventing the fluid from exiting the actuator (unless the valve is opened). The flexible tubing 118 may also or alternatively attach to an inflator valve 124 at the inflation device 120 for regulating the supply of inflation fluid at the location of the inflation device 120.

The flexible tubing 118 may also include an actuator connection interface 122 for releasably connecting to the interface 114 at one end and the inflation device 120 at the other end. By separating the two parts of the actuator connection interface 122, different inflation devices 120 may be connected to different interfaces 114 and/or actuators 100.

The inflation fluid may be, for example, air or saline. In the case of air, the inflation device 120 may include a hand-operated bulb or bellows for supplying ambient air. In the case of saline, the inflation device 120 may include a syringe or other appropriate fluid delivery system. Alternatively or in addition, the inflation device 120 may include a compressor or pump for supplying the inflation fluid.

The inflation device 120 may include a fluid supply 126 for supplying an inflation fluid. For example, the fluid supply 126 may be a reservoir for storing compressed air, liquefied or compressed carbon dioxide, liquefied or compressed nitrogen or saline, or may be a vent for supplying ambient air to the flexible tubing 118.

The inflation device 120 further includes a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity. To supply the electricity, the inflation device 120 may include a power supply 130, such as a battery or an interface to an electrical outlet.

The power supply 130 may also supply power to a control device 132. The control device 132 may allow a user to control the inflation or deflation of the actuator, e.g. through one or more actuation buttons 134 (or alternative devices, such as a switch). The control device 132 may include a controller 136 for sending a control signal to the fluid delivery device 128 to cause the fluid delivery device 128 to supply inflation fluid to, or withdraw inflation fluid from, the actuator 100.

Exemplary Structures for a Robotic End Effector

Exemplary embodiments relate to structures suitable for use with robotic end effectors or end of arm tools (EOATs) employing one or more robotic actuators. The exemplary structures improve grasp stability when the actuator(s) attempt to grasp relatively compliant objects such as bagged items.

It is noted that, in the examples below, the stabilization structures are described as being used in conjunction with soft robotic actuators as outlined above. However, although soft robotic actuators may provide advantages when used with the stabilization structures, as alluded to above and addressed in more detail below, it is understood that the present invention is not limited to use with soft robotic actuators.

Exemplary embodiments provide a centralized back-stop against which the actuator(s) may squeeze the bag or other product during grasping. By using the described structures, a lower pressure of inflation fluid may be used in the actuators (resulting in a more delicate hold on the target object) while still maintaining an effective grasp on the target object.

Figure 2A:
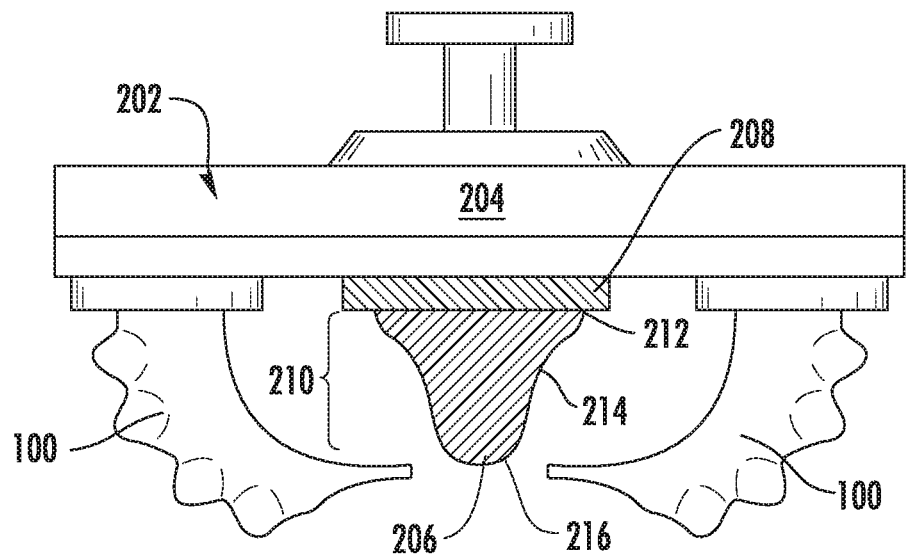
FIGS. 2A-2D depict examples of stabilization structures for robotic end of arm tools.

FIG. 2A depicts an example of such a stabilization structure. The structure may be deployed on a base 202 of a robotic end effector, such as on a grasper for a robotic arm, an end of arm tool (EOAT), or other robotic device capable of grasping a target object. For instance, the exemplary grasper of FIG. 2A includes two soft actuators 100. The base 202 may be a portion of the robotic body or arm which is configured to receive an end effector (e.g., through the use of fasteners or other securing devices), or the end effector may be integral with the robotic body or arm.

As shown in FIG. 2A, the exemplary structure may be provided in a centralized location in a palm area 204 in proximity to one or more actuators 100. The palm area 204 may be different on each end effector, depending on the configuration of the actuator(s) 100 or other grasping implements, as well as other structures present on the end effector. For instance, in the two-actuator example of FIG. 2A, the palm area 204 may extend from a base of one actuator 100 across the end effector to a base of the other actuator 100 (in a left-to-right direction in FIG. 2A). The palm area 204 may further extend in other directions, such as along a length of the end effector. Particularly in the case in which multiple actuators 100 are aligned along a side of the end effector (see, e.g., FIGS. 3A-3B), the palm area 204 may include the regions between the actuators in the length and width directions of the end effector. In other embodiments, the end effector may employ only a single actuator 100, in which case the palm area 204 may include the area extending in a radial direction perpendicular to the base of the actuator 100 when the actuator is in an uninflated state, and may include an area under the distal end of the actuator 100 when the actuator is in an inflated state. Depending on the principal of operation, (e.g., as in the examples shown in FIGS. 4A-4J and 10A-10D) the palm area 204 might extend beyond the area under the distal tip(s) of the actuators, so that the stabilization structure may be provided in a position so that the distal tip(s) push the target object into the stabilization structure, rather than curling around under the stabilization structure.

The stabilization structure may be provided primarily in the palm area 204, although portions of the stabilization structure may extend beyond the palm area 204 and the stabilization structure need not cover the entire palm area. Rather, the body 210 of the stabilization structure should be sized, configured, and located so as to provide a backstop against which the actuator(s) 100 push the target compliant object during grasping, in accordance with the methodologies described below.

The stabilization structure, also referred to herein as a keel, may be a rigid or semi-rigid structure around which the actuators may curl. In some embodiments, the stabilization structure may be formed of rubber or rubber-coated plastic. In some embodiments, the stabilization structure may be a soft robotic actuator 100.

In some embodiments, the stabilization structure may be provided with different surface textures or materials. In some examples, the stabilization structure may be designed with a first texture or shape, and may be configured to accept one or more coverings or other attachable structures to accommodate different textures or shapes. For example, the stabilization structure may be designed with a smooth plastic finish with blended curves (which may be particularly well-suited to food-handling operations or other situations in which cleaning the end effector is an important consideration), and may be provided with one or more covers to provide different textures, shapes, levels of compliance, etc.

The stabilization structure may include a body 210 having a target area 206 against which the grasping tips of the actuators 100 (e.g., an area at the respective distal ends of the actuators) are configured to approach or contact. The stabilization structure may be affixed to the base 202 of the end effector and/or a base of the gripper via a stabilization structure base 208 provided in the palm area 204.

The target area 206 may be defined by the stabilization structure's profile. In the example of FIG. 2A, the body 210 of the stabilization structure includes a first region 212 adjacent to the base 208, the first region having a relatively wide convex profile. The first region 212 transitions to a second region 214 that is convex and has a relatively narrower profile. The second region 214 transitions into a third region 216 that includes a rounded external side. In operation, the actuators 100 may curl the ends of the target object to be grasped around the body 210 of the stabilization structure, forcing an intermediate area on the target object into the convex second region 214. The first region 212 serves to provide a larger surface area around which the ends can curl, while the third region 216 causes the target object to bend around itself. Thus, the size and shape of the third region 216 may be selected based on the properties of the target object (e.g., being selected so as to allow a certain degree of bending for stability purposes, while not allowing for a greater degree of bending that could cause the target object to be damaged).

Different profiles may be employed depending on the shapes and/or textures of target object that the end effector is designed to engage with. The shape may therefore be selected based on product composition, and the stabilization structure may be configured to be releasably coupled to a manifold assembly via the base 208 so that different structures may be swapped in order to reconfigure the end effector for different types, sizes, weights, shapes, etc. of products.

Figure 2B:
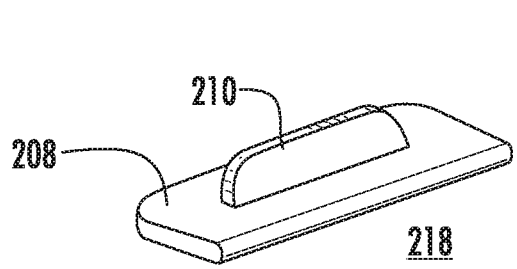
Figure 2C:
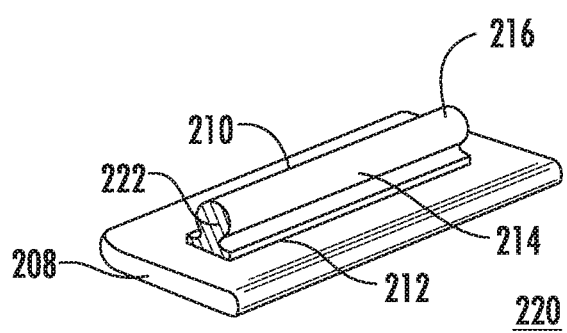
Figure 2D:
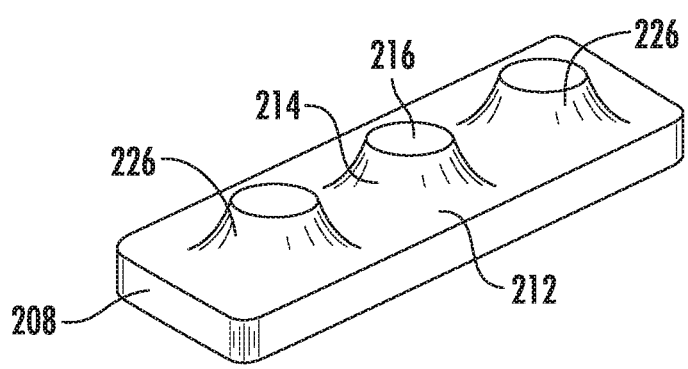

Examples of different structure shapes are shown in FIGS. 2B-2D. FIG. 2B depicts a stabilization structure 218 having a rounded ridge of relatively constant thickness as a body 210, which rises out of the central region of the base 208. FIG. 2C depicts a stabilization structure 220 having a keyhole shape, in which the first region 212 is concave, transitioning to a second region 214 that is convex at a transition point 222 (selected based on the properties of the object to be grasped, to thereby provide a ridge around which the sides or ends of the target object may be curled). A third region 216 forms the top of the body 210 of the stabilization structure 210. FIG. 2D depicts a stabilization structure 224 having a plurality of pyramid-shaped bumps 226, which allow portions of the target object to fill in the interstices between the bumps 226, thus allowing for a stronger grasp on the target object.

The profile of the stabilization structure may be selected and optimized based upon many factors, such as (but not limited to) the amount of compliance in the system. For example, if there is robot wrist compliance along the axis of motion corresponding to the direction in which an object is initially lifted during a pick up maneuver, then the shape of the stabilization structure body 210 may be selected to work in conjunction with this compliance to engage with the product in an optimized way.

Furthermore, if there is compliance in the stabilization structure itself or the base 208 of the stabilization structure, then the body shape 210 may be optimized around this compliance. This may allow the system to provide the desired level of contact force at the end effector height associated with grasping the product. One application for this embodiment includes driving some amount of granular product out towards the ends of a bag to "stiffen" or "pack" the shifting product into the grasp area on the bag. Consequently, the robot's grasp on the bag may be further improved.

Figure 3A:
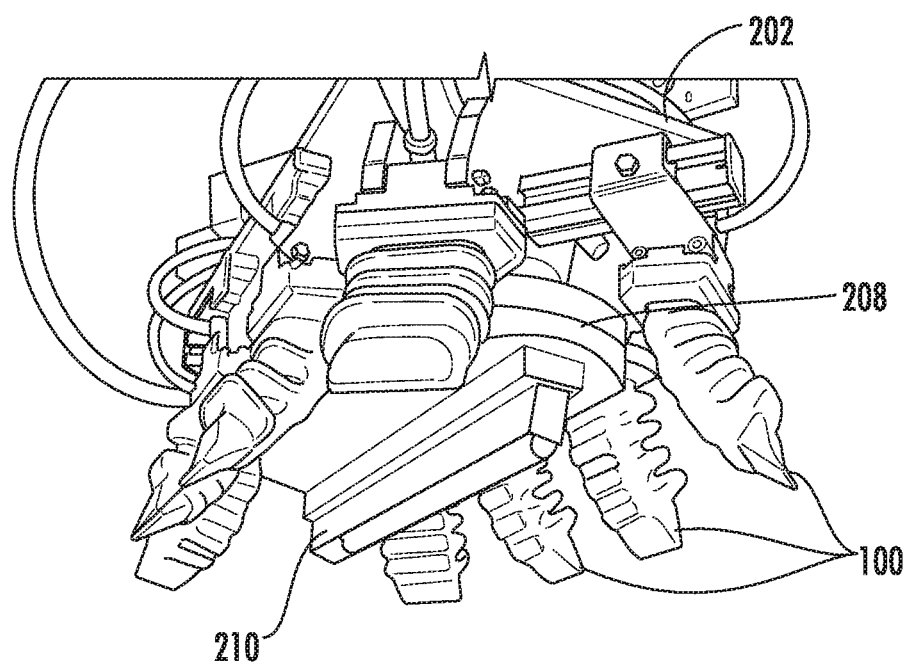
FIGS. 3A-3B depict an exemplary stabilization structure employed to grasp a target compliant object.
Figure 3B:
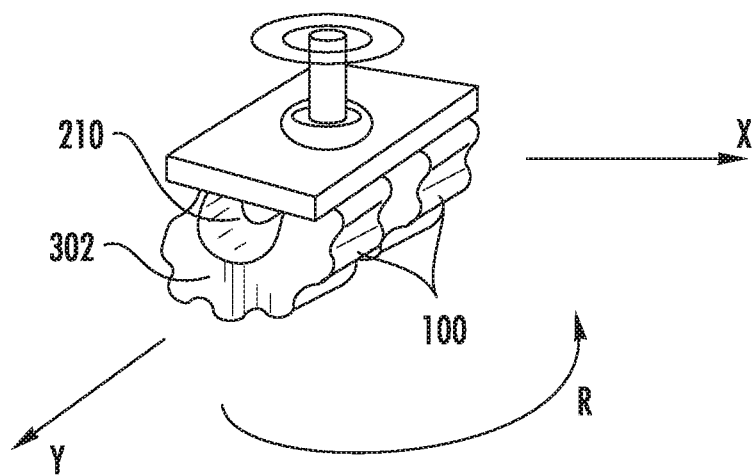

FIGS. 3A-3B depict an example of a multi-actuator robotic end effector. In this example, eight actuators 100 are arrayed along the outside edges of an end effector base. A palm area is formed in the region of the end effector base between the actuators 100. A base 208 of the stabilization structure occupies substantially all of the palm area, and a body 210 of the stabilization structure includes a first region with a relatively wide profile and a second region attached to the first region and including a relatively constant-width ridge.

As shown in FIG. 3B, the end effector is capable of moving a grasped object 302 in a y-direction (along an axis of rotation of the actuators 100), an x-direction perpendicular to the y-direction in the same plane as the y-direction, and can also be rotated in an r-direction. In some embodiments, the end effector may also be capable of moving in a Z-direction (e.g., towards the top and bottom of the page in FIG. 3B).

The exemplary stabilization structures described herein provide a number of benefits, including:

Increasing stability of the actuators' grasp on the target object during the grip phase;

Increasing stability of the actuators' grasp on the target object subjected to X-, Y-, and R-axis acceleration;

Enabling lower inflation fluid pressure to be used for grasping a bagged or compliant target object with the same or an improved grasp stability and quality as compared to higher pressures without the use of the structure; and Providing the actuators with a backstop against which the target object may be compressed.

FIGS. 4A-4J depict a grasping process and show a principle of operation of certain embodiments described herein. FIGS. 4A, 4C, 4E, 4G, and 4I depict the entire end effector and grasped object 302 at various points in the process, while FIGS. 4B, 4D, 4F, 4H, and 4J depict the same stages with certain structures omitted so that the effect on the target object 302 can be observed more easily.

Figure 4A:
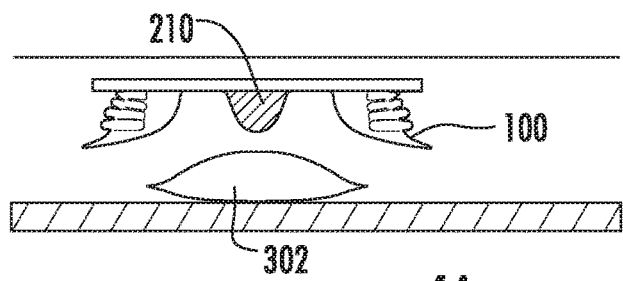
FIGS. 4A-4J depict various stages in the grasping process, showing interactions between the stabilization structure, the target object, and the actuators.
Figure 4B:
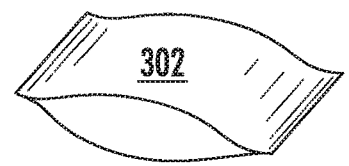

In use, a compliant target object 302 such as a bagged product may be provided in a target area accessible to the end effector (FIGS. 4A-4B). Optionally, the actuators 100 may be subjected to reverse inflation (FIG. 4A) so as to move the distal tips of the actuators 100 away from the target object 302, thus allowing for a wider grasp (and allowing the end effector to be moved into position with a reduced chance that the actuators 100 will prematurely come into contact with the target object 302, thus moving the target object 302 in an undesirable manner).

Figure 4C:
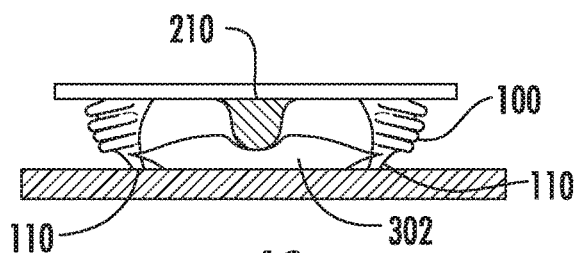
Figure 4D:
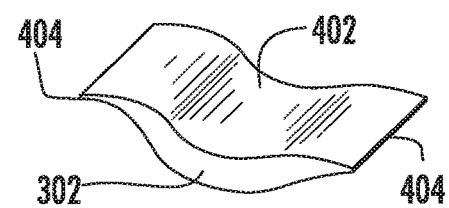
Figure 4E:
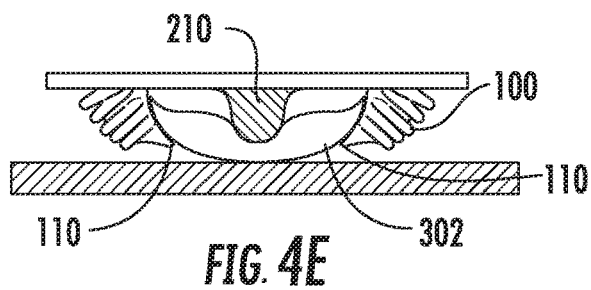
Figure 4F:
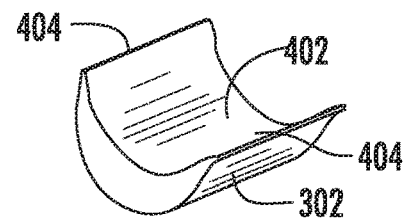
Figure 4G:
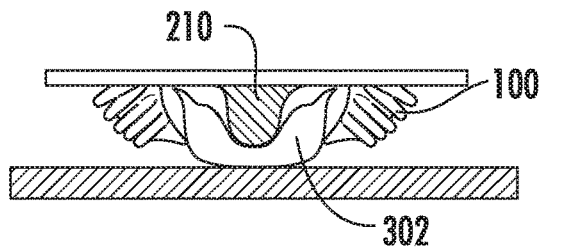
Figure 4H:
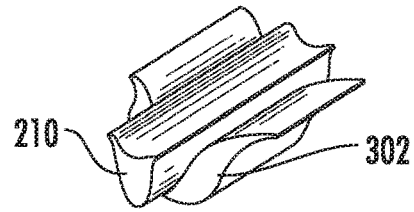

The end effector may be positioned in proximity to the target object 302 and may make initial contact with the target object (FIGS. 4C-4D). Preferably, the end effector may be relatively centered over an axis of the target object 302. Optionally, at this stage, the actuators may be subjected to neutral inflation to move into a neutral position (FIG. 4C). Preferably, the distal tips 110 of the actuators 100 may be positioned at this stage so as to be outside of and/or under the edges 404 of the target object 302.

The initial contact with the target object 302 may cause the target object 302 to slightly deform around the body 210 of the stabilization structure, causing a groove 402 to be formed in a central region of the target object (FIG. 4D). Depending on the shape and configuration of the stabilization structure other types of manipulations may also or alternatively occur upon contact with the stabilization structure.

Advantageously, this deforming/manipulation may allow the target object to be re-shaped to a certain degree while the actuators 100 are held open, prior to grasping the object 302. This could result, for example, in the stabilization structure pressing a central lump in a bagged product into an indented groove (or between ridges, as shown for example in FIGS. 8A-8B), which forces loose movable products in a bag to redistribute for a more favorable grasp. This may occur over a short period of time between when the stabilization structure makes initial contact with the target object 302 and when the actuators 100 inflate and initiate a grasp on the target object 302. Consequently, redistribution and grasping may happen almost concurrently, which allows for a relatively strong grasp in a relatively fast, efficient process. In comparison, without such a stabilization structure an end effector might be forced to attempt to grasp the target object 302 as-is (i.e., as it is shaped when presented to the end effector), which may lead to highly variable grasping quality.

Figure 4I:
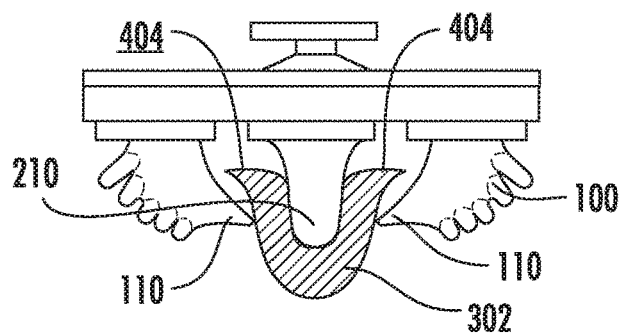
Figure 4J:
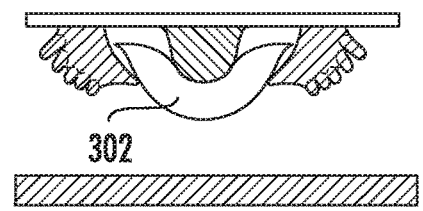

The actuators 100 may then be inflated, which pushes the edges 404 of the target object around the stabilization structure (FIGS. 4E-4H). The end effector may then be lifted, rotated, translated, etc. while the actuators grasp the target object (FIGS. 4I-4J).

Figure 6:
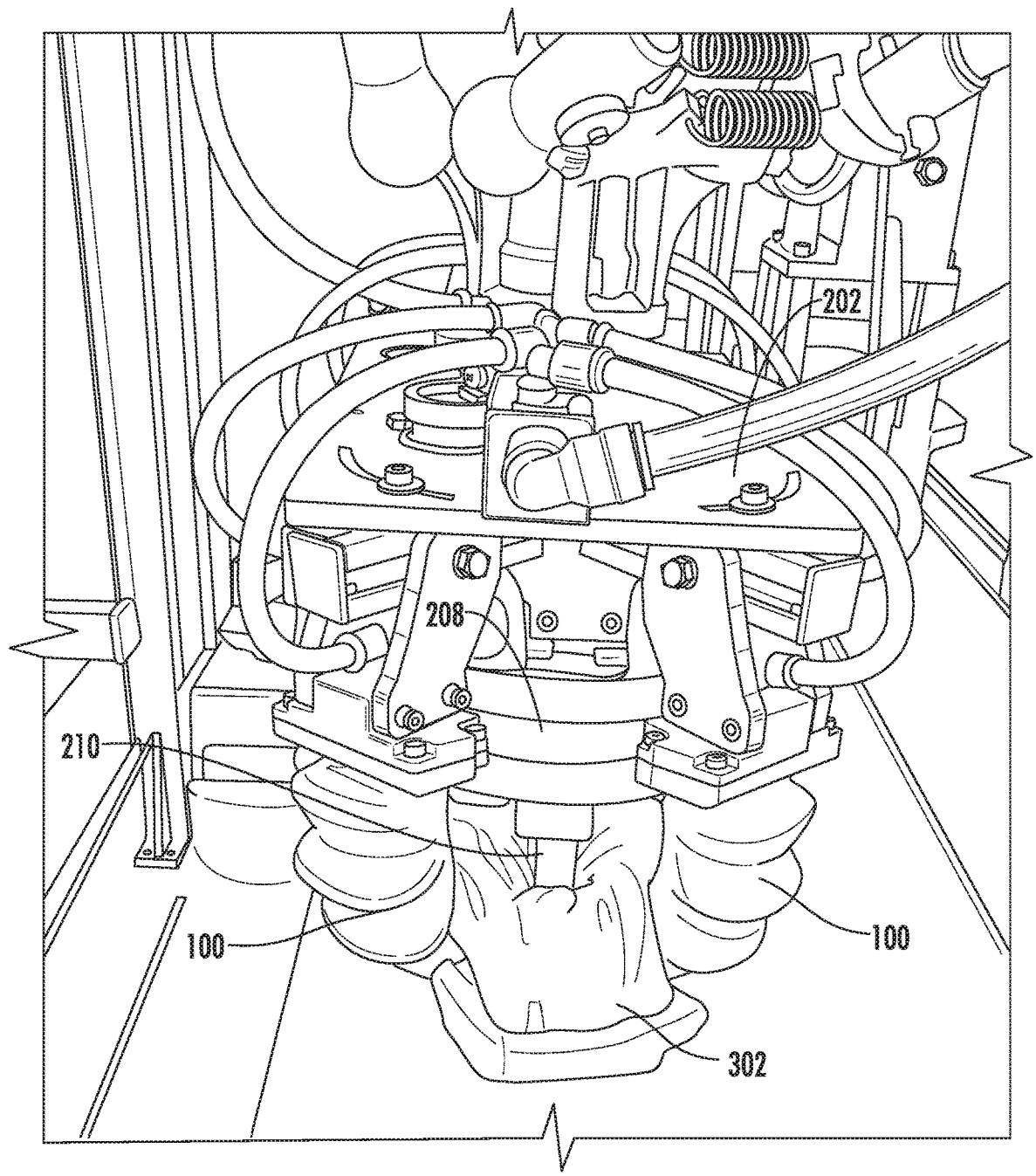
FIG. 6 depicts the target object in a grasped configuration.

In a conventional end effector without the use of a stabilization structure, the actuators 100 would be required to grasp the target without assistance, which can cause the target object to slip out of the actuators' grasp during relatively high acceleration or deceleration movements. The stabilization structure shown in FIGS. 4A-4J serve to take some of the load from the acceleration of the target object, which provides an improved ability to resist the effects of acceleration on the target object. A more detailed view of the end effector grasping a target object is shown in FIG. 6.

Variations of the above-described embodiments (e.g., employing more or fewer actuators, actuators in different configurations, different sizes or shapes of end effectors, etc.) may also be utilized.

Figure 5:
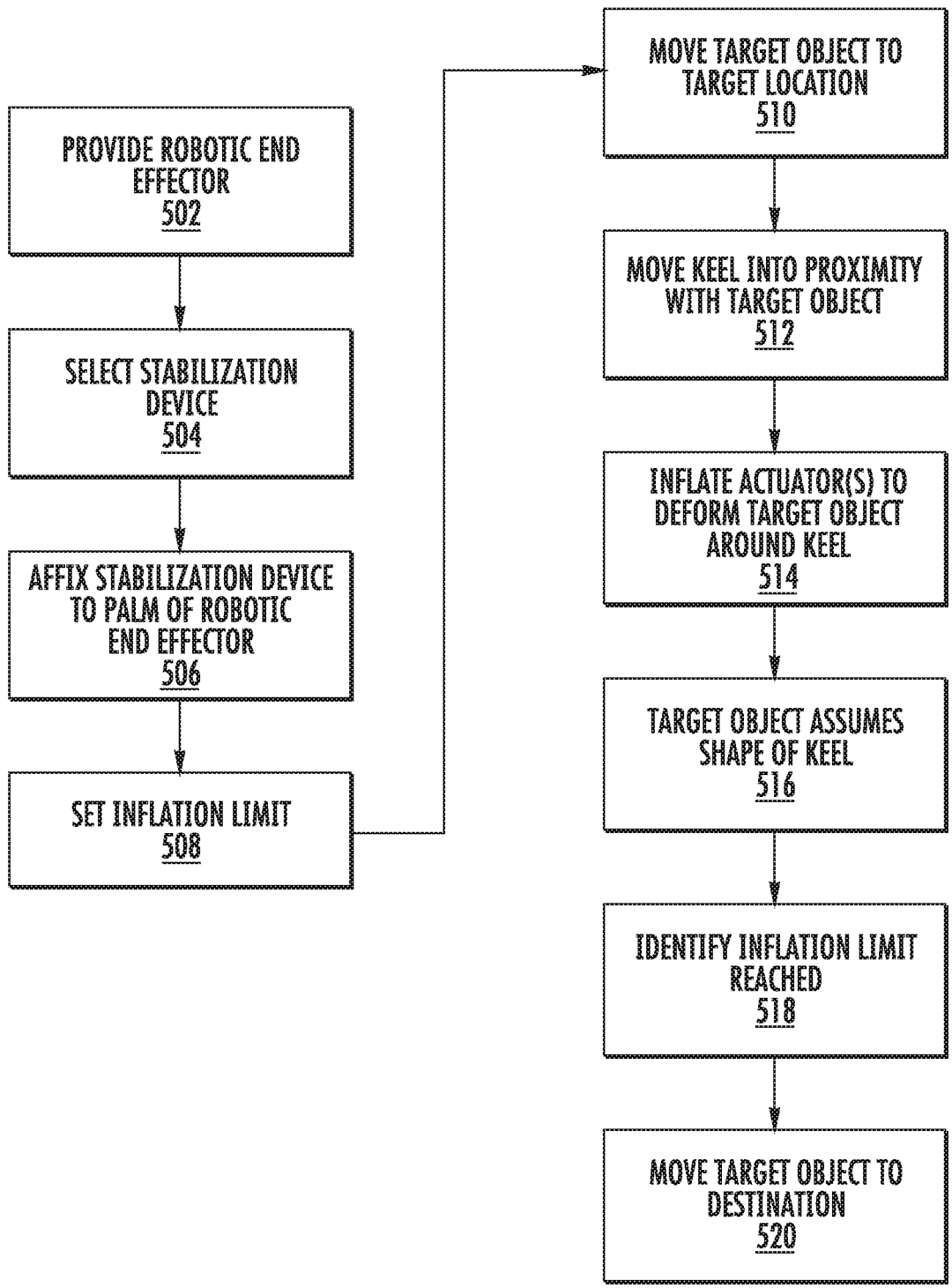
FIG. 5 is a flowchart depicting an exemplary method for grasping a target compliant object.

FIG. 5 describes a procedure for deploying and using an end effector with a stabilization structure.

At block 502, a robotic end effector may be provided. The robotic end effector may be any device suitable for grasping or otherwise manipulating a target object. The robotic end effector may include a robotic arm, a robotic grasper or hand, a robotic tentacle, an end-of-arm tool (EOAT), etc. The robotic end effector may be separate from the stabilization device, or may be integral with the stabilization device. The robotic end effector may be at a fixed location, or may be mobile.

At block 504, a stabilization device may be selected for deployment on the robotic end effector. The stabilization device may have a size, shape, texture, configuration, etc. specific to the stabilization device, and a particular stabilization device may be selected based on the context in which it is employed. Among other features, the stabilization device may be selected based on: a number, size, or configuration of actuators on the end effector; a size, shape, texture, etc. of an exterior surface of the target object; a compressibility and/or degree of movement or shifting expected based on material on an interior of the target object; a direction of movement of the target object once grasped, a weight of the target object; etc.

At block 506, the stabilization device may optionally be affixed to a palm area of the robotic end effector, if the stabilization device and end effector are not integral. The stabilization device may be affixed using fasteners, such as bolts that pass through a base of the robotic end effector and a base of the stabilization device, and secured using nuts (such as those shown in FIGS. 8A-8B). Alternatively or in addition, the stabilization device may be affixed using clamps, screws, pins, a magnetic attachment, suction, ties, mating grooves, tabs, or slots, or any other suitable fasteners.

At block 508, an inflation limit may be selected for soft actuators of the robotic end effector (alternatively, if hard actuators are used, a maximum extension limit may be defined). The limit may be defined based on a target pressure to which the actuators should be inflated, a target amount of force to be applied to the target object, a distance of extension or degree of flexion desired of the actuator, etc.

Instead of a particular value, an acceptable inflation range may be provided. According to some embodiments, the inflation limit may preferably be in the range of 9-13 pounds per square inch (PSI). In another embodiment, the limit may be a range of values such that the lower end of the range corresponds to an amount of inflation/extension that would be barely sufficient to hold the target object through a desired movement sequence (e.g., a value determined empirically or by simulation that maintains a grasp on the target object more than a predetermined percentage of times); the upper end may correspond to a maximum amount of inflation/extension such that further inflation/extension would cause damage to the product. In some embodiments, the inflation limit may be selected to correspond to a degree of deployment of the actuators such that, when the actuators are deployed to the identified degree, the target object is secured to the stabilization device in a desired configuration (e.g., bent around the stabilization device by a desired amount, deformed or manipulated to a certain degree, etc.).

At block 510, the target object may be moved to a target location. The target object may be moved, for example, into a position under the robotic end effector. In some embodiments, the target object may be moved into position along a conveyor belt. In some embodiments, the target object may be provided to the target location in a predetermined position (e.g., so that the long axis of the target object is oriented in a predetermined direction), or may be manipulated by the end effector or another device so as to be moved into the predetermined position once the target object is moved into the target location.

At block 512, the stabilization structure may be moved into proximity with the target object. In some embodiments, this may involve making contact with the target object, while in others the stabilization structure may be moved to within a predetermined distance of the target object. The movement of the stabilization structure (and the end effector to which it is attached) may be guided by various sensors, such as proximity sensors, cameras, touch sensors, etc. In some embodiments, the end effector may be positioned in this block so as to be relatively centered over an axis of the target object 302. The axis of the target object may represent a grasping axis along which the actuators may be arrayed (e.g., along a long axis of the stabilization structure when the object is grasped).

At block 514, the actuators may be inflated to deform the target object around the stabilization device. The actuators may be inflated by supplying an inflation fluid to the actuators (e.g., through tubing or another delivery mechanism that supplies the inflation fluid into the inner void of the actuator). As the actuators are inflated, they may make contact with (e.g.) the ends of the target object, curling the target object around the stabilization device. In other embodiments, portions of the target object may be pushed into the stabilization device directly. In either case, the target object may begin to deform around the stabilization device. In some embodiments, the action of the actuators may cause material inside the target object to become distributed between ridges on the stabilization device.

At block 516, the target object may continue to assume the shape of the stabilization device until, at block 518, the system identifies that the inflation limit has been reached (or that the inflation amount, or degree of extension for a hard actuator, is within the range identified in block 508).

Having thus secured the target object in the grip of the end effector, at block 520 the end effector may be translated and/or rotated to move the target object to a desired destination or configuration.

The above-described technique may be employed with the previously-described stabilization devices. However, as alluded to above, other configurations of stabilization devices may be used for a variety of purposes. FIGS. 7A-7D depict alternative configurations for the stabilization devices.

Figure 7B:
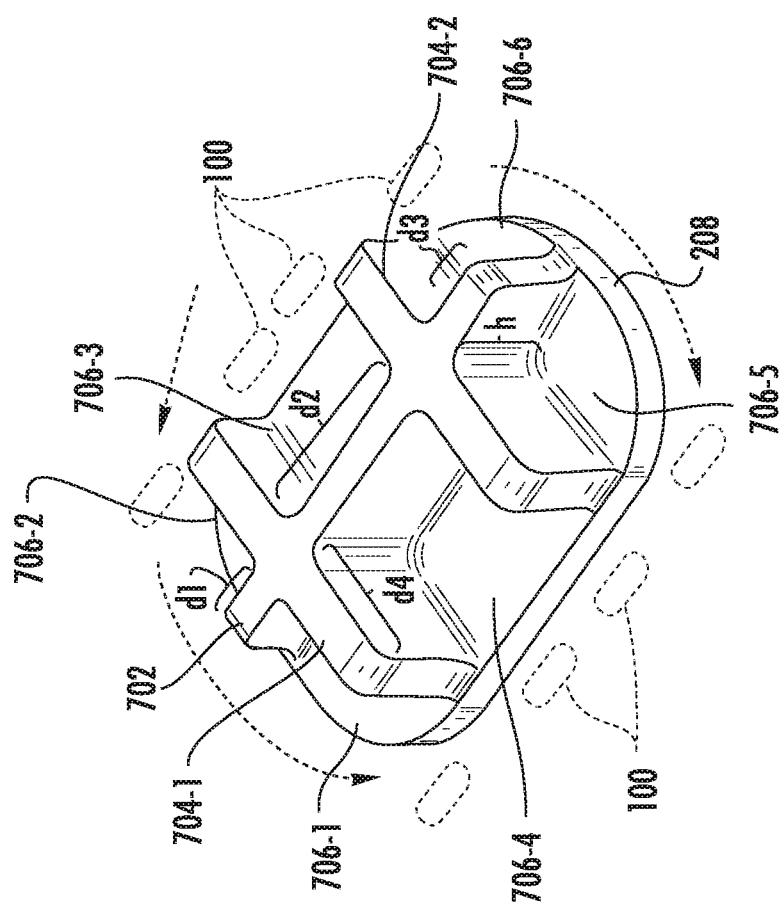
FIGS. 7A-7F depict various alternative configurations for the stabilization structure.
Figure 7A:
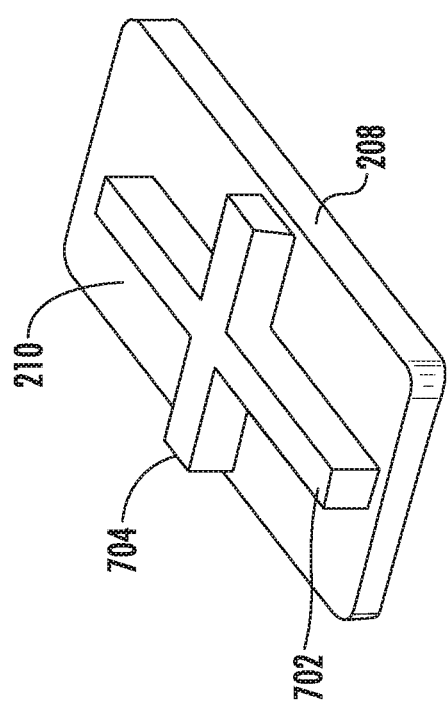
Figure 7D:
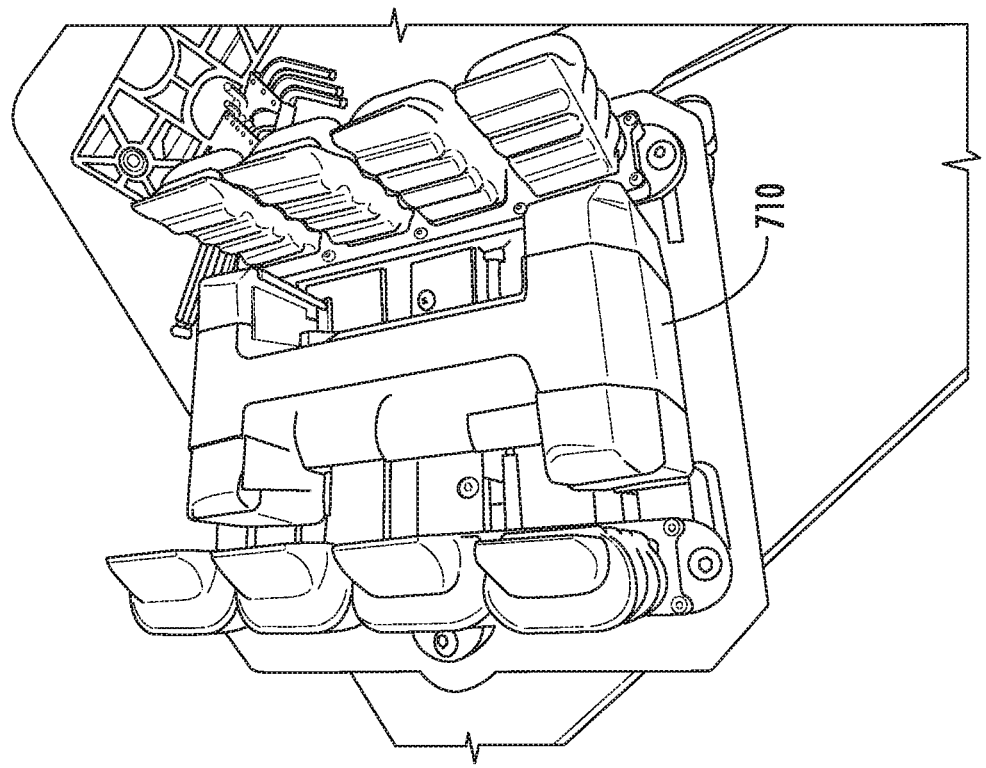
Figure 7C:
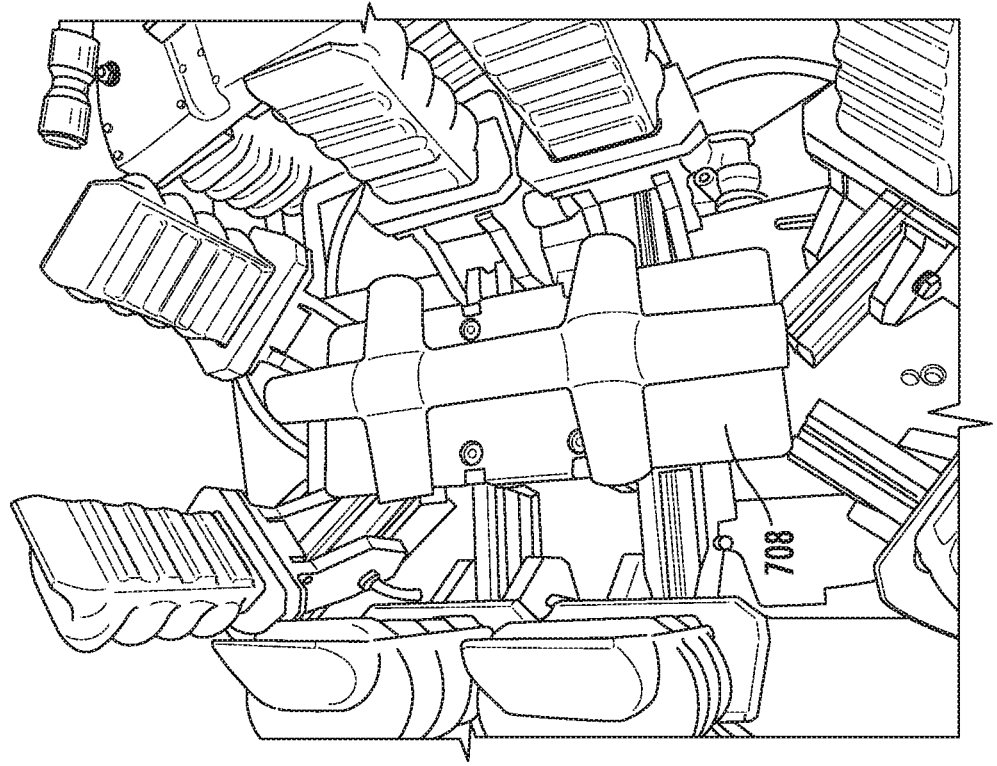

Whereas the stabilization devices depicted in FIGS. 3A-3D utilize one or more extended areas or ridges provided along a single axis, the stabilization devices of FIGS. 7A-7D include extended areas or ridges provided along multiple axes. For instance, FIG. 7A depicts a stabilization device including a first ridge 702 extending along a long axis of the base 208 of the stabilization device, and a second ridge 704 perpendicular to the first ridge. This may define four openings or quadrants into which actuators may be deployed upon inflation or extension. The actuators may be arranged around the stabilization device to effect such a grip.

FIG. 7B depicts a similar example in a double-cross pattern. In this example, the first ridge 702 extends along the length of the base 208, but is intersected at two locations by perpendicular ridges 704-1, 704-2 (in other embodiments, additional perpendicular ridges, or ridges along the long axis, may be provided). The intersection points may be selected to define a first distance d1 (between the end of the first ridge 702 and the first perpendicular ridge 704-1), a second distance d2 (between the first perpendicular ridge 704-1 and the second perpendicular ridge 704-2), and a third distance d3 (between the second perpendicular ridge 704-2 and the opposing end of the first ridge 702). These distances d1, d2, d3 may be selected so as to define a set of gaps 706-1, 706-2, 706-3, 706-4, 706-5, 706-6 into which material from the target object may be pushed, compressed, or otherwise secured. A height h of the various ridges may be selected to provide sufficient space based on the material to be manipulated. The actuators 100 may be deployed in a configuration around the stabilization device so as to encourage the material into the gaps 706-i.

These configurations allow the contents of a target object, such as a bag of material (e.g. chemical powder, rice, grains, etc.), to be subdivided into multiple clumps that the actuators may "brick" into a semi-rigid structure during momentary handling.

Figure 7F:
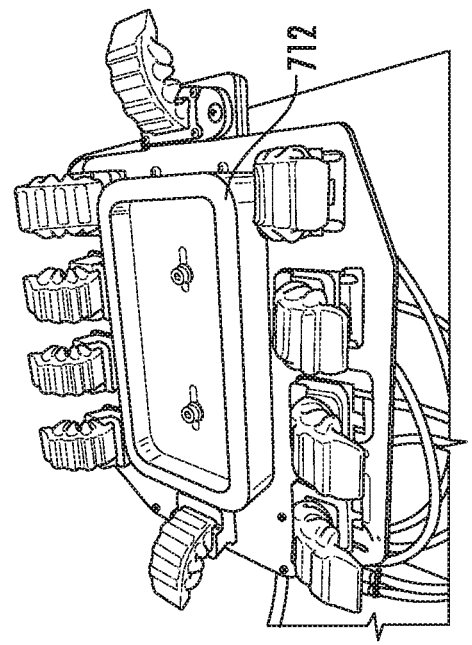
Figure 7E:
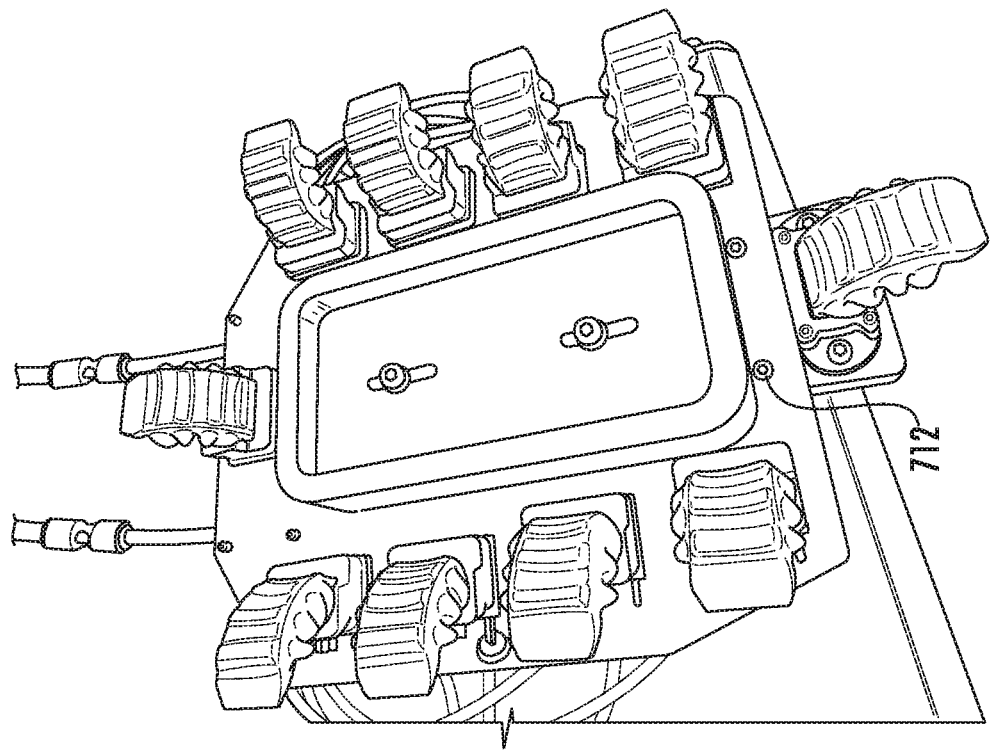

The configuration of the actuators 100 may be determined based on the location of the gaps into which material is to be encouraged and/or ridges onto which the material is to be held by the actuators 100. Compare, for example, the configuration of the actuators used in conjunction with the double-cross stabilization device 708 of FIG. 7C to the configuration of the I-beam stabilization device 710 of FIG. 7D. FIGS. 7E-7F depict another alternative, in which the ridge of the stabilization device 712 takes the form of a ring around a hollowed-out central portion.

Figure 8B:
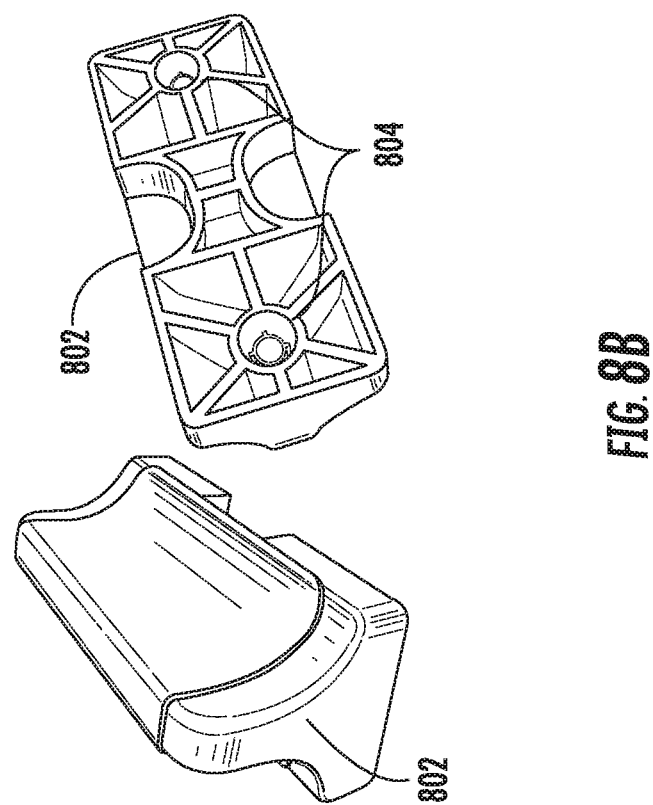
FIGS. 8A-8B depict a stabilization structure having two ridges for grasping and a securing device for securing the stabilization structure to a robotic end effector.
Figure 8A:
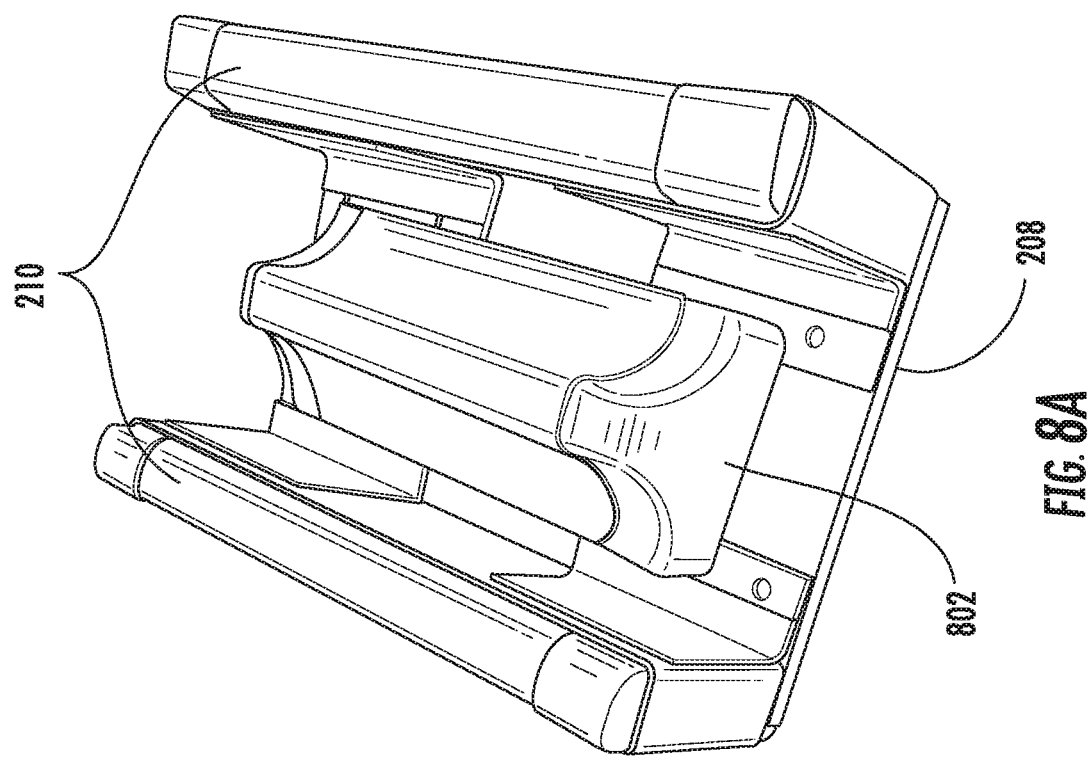

Turning to FIGS. 8A-8B, an exemplary fastening mechanism 802 for fastening the stabilization device to the end effector is depicted. The fastening mechanism 802 may be in the shape of a ridge deployed between two ridges 210 of the stabilization device. Depending on the application, the fastening mechanism 802 may be sized and shaped so as to not interfere with the target object when the target object is grasped by the actuators, or so as to provide an additional surface against which the target object may be pressed.

The fastening mechanism 802 may include one or more threaded openings 804 for receiving bolts passed through the base 208 of the stabilization device and/or through the base of the end effector. The bolts may be screwed into the threaded openings 804, thus holding the fastening mechanism 802 against the base 208.

Other shapes or configurations for the fastening mechanism 802 may also be employed.

Figure 9A:
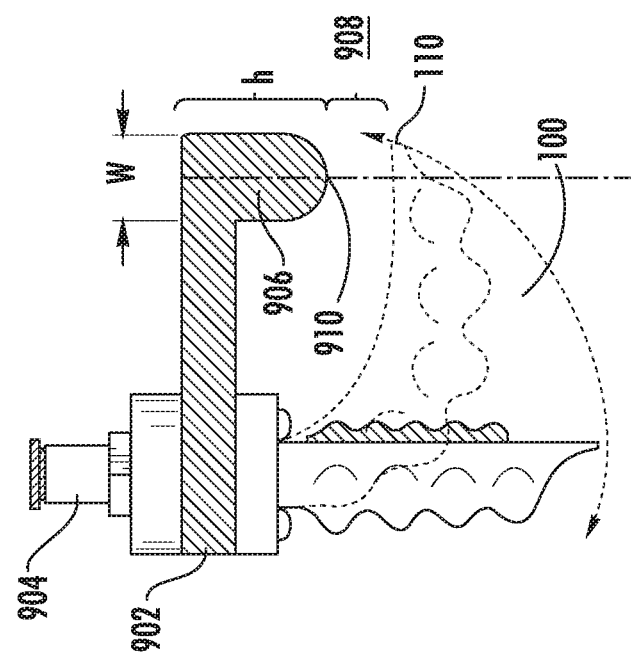
FIGS. 9A-9C depict alternative configurations for the stabilization structures with respect to the distal ends of the robotic actuators.
Figure 9B:
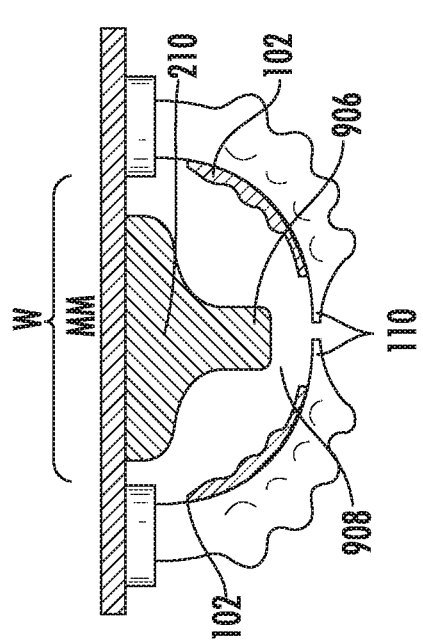
Figure 9C:
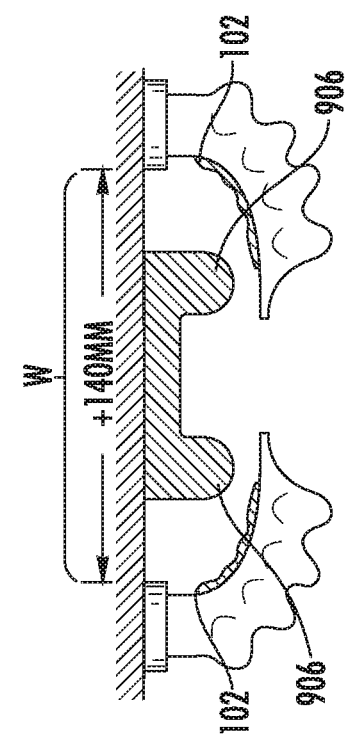

In the example above from FIGS. 4A-4I, the target object was curled around the stabilization device, and the edges of the target object were pushed, by the distal ends of the actuators, into the sides of the stabilization device body. FIGS. 9A-9C depict an alternative configuration in which portions of the main body of the target object are secured between the distal ends of the actuators and the tip of the body of the stabilization device.

In this example, the base 902 of the end effector may be secured to the remainder of the robotic system via a pedestal 904, which may include a passage for providing inflation fluid to the actuator 100. The base 902 may include a flange 906 extending from the body of the base 902 by a height h and a width w. A target region 910 may be provided at the end of the flange closest to the distal end 110 of the actuator 100 when the actuator 100 is in an inflated or deployed state. The width 906 and a shape of the target region 910 may define an area against which the target object is pressed by the actuator 100. The height h may define an amount of space 908 between the actuator 100 distal end 110 (when in the inflated state) and the end of the flange. This amount of space 908 may be varied depending on the nature of the target object to be grasped.

This configuration provides an anvil-like feature at a specific location relative to each actuator 100 to allow each actuator 100 to compress a target object including a container (e.g., a bag) and some of the contents provided in the container against the anvil-like feature to establish an improved grip on the target object.

As shown in FIG. 9B, a stabilization device having a center rib keel may be employed when the actuator 100 spacing (defined by a width w between bases or hubs of corresponding facing actuators 100) is fairly close together (e.g., less than 140 mm, or more preferably 80-120 mm) on a parallel style gripper. When the actuator spacing is widened on a parallel gripper for larger size bags (e.g., to a width of 140 mm or greater), then a dual rib stabilization device may be used since it provides a similar structure for each row of fingers to squeeze the product against as the single center rib did in the smaller finger spacing configuration. Like the original stabilization device concepts, these stabilization devices may aid in locking the product in place while soft robotic actuators curl under the target object and encourage the target object up into the stabilization device to both stabilize the target object during high speed handling motion and improve the grasp quality on the product (reducing shifting contents that flow around where the soft robotic fingers are contacting the product bag, which leads to product pooling below the grasp location of the soft robotic actuators).

Figure 10A:
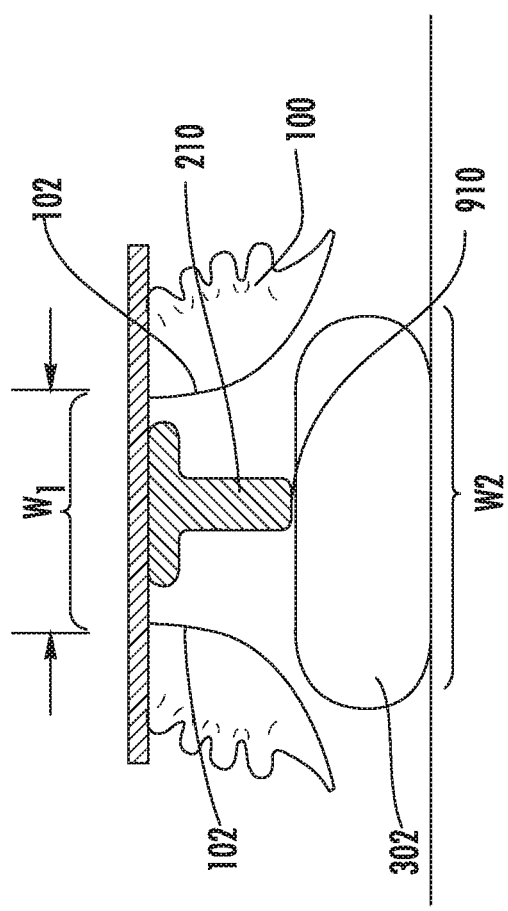
FIGS. 10A-10D depict an alternative grasping process for grasping a compliant object.
Figure 10B:
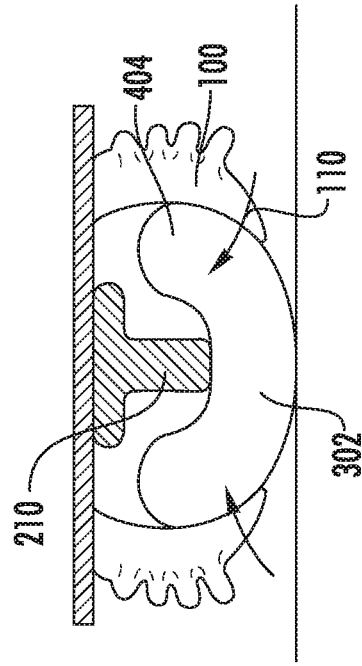
Figure 10C:
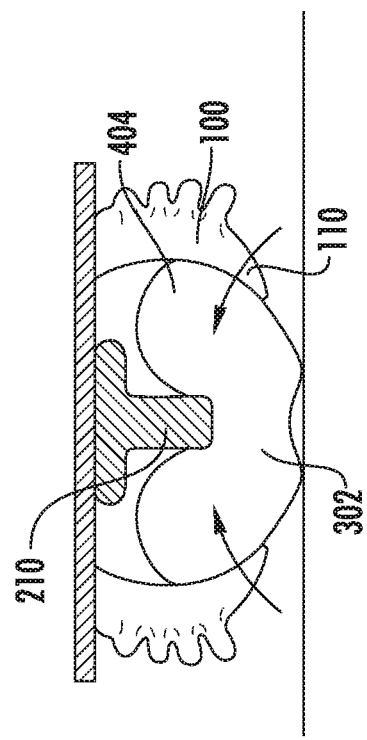
Figure 10D:
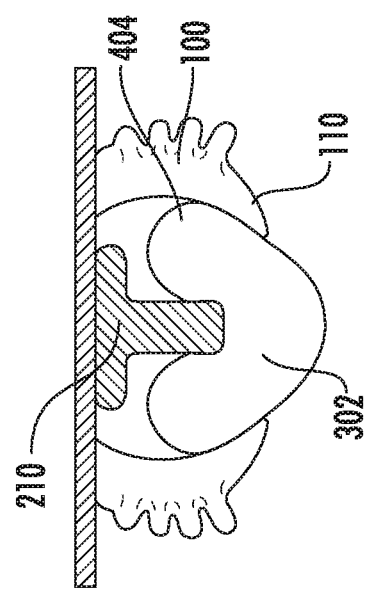

FIGS. 10A-10D depict this principle in operation. In these examples, parallel actuators 100 are spaced apart by a width $w_1$ that is less than a width $w_2$ of a target object 302 to be grasped (e.g., where $w_2$ is perpendicular to a long axis of the target object). In this example, the stabilization device body 210 is lowered so as to be just above (e.g., not in direct contact) with the target object 302 (FIG. 10A). Upon being deployed, the distal ends 110 of the actuators 100 may curl around an underside of the target object 302, forcing the ends 404 of the target object up around the body 210 of the stabilization device (FIGS. 10B-10C). Upon reaching the inflation limit (FIG. 10C), the target object 302 is bent around the body 210 of the stabilization device until it locks, with the contents of the target object 302 being jammed against the stabilization device and the container for the contents being taut. In some embodiments, the inflation limit may be defined based on a bend limit for the container, representing a maximum degree of bending that is permissible before the container splits or breaks.

As can be seen in these examples, the target region of the stabilization device body 210 against which the target object 302 is to be squeezed may be at the tip of the body 210, as in FIGS. 9A-9C, and/or may be along the sides of the stabilization device body 210, as shown in FIGS. 10A-10D.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

CONCLUSION

Any or all of the above-described techniques may be implemented by suitable logic stored on a non-transitory computer-readable medium. When executed by one or more processors, the logic may cause the processors to perform the techniques identified above. The logic may be implemented fully or partially in hardware. The logic may be included as part of a controller for controlling the actuation, de-actuation, movement, position, etc. of a soft robotic actuator and/or a soft robotic system employing one or more actuators in a gripper arrangement.

The invention claimed is:

1. A stabilization device for a robotic end effector comprising first and second robotic actuators capable of moving between an undeployed state and a deployed state by curving along a central axis of rotation, respective distal ends of the first and second robotic actuators being brought into proximity with a palm region of an end effector base when the first and second robotic actuators are in the deployed state, wherein:

the first robotic actuator has a first actuator base on a radially interior side of the first robotic actuator and the second robotic actuator has a second actuator base on a radially interior side of the second robotic actuator, the first robotic actuator and the second robotic actuator base are deployed on the robotic end effector so that the first actuator base and the second actuator base are parallel to each other and in a facing configuration when the first robotic actuator and the second robotic actuator are in the undeployed state, and the palm region comprises a space on the end effector base between the first robotic actuator and the second robotic actuator, the stabilization device comprising:
a stabilization device base sized and shaped to fit in the palm region of the robotic end effector; and
at least one ridge extending away from the stabilization device base by a height, the ridge having a length extending parallel to the central axis of rotation of the first and second robotic actuators, wherein the at least one ridge has a side that is concave or flat and defines a target area that is positioned so that, when the first and second robotic actuators are in the deployed state, at least a portion of a target object is provided in the target area and is secured in place between the distal ends of the first and second robotic actuators and the target area, respectively, wherein the at least one ridge is a first ridge, and further comprising a second ridge extending perpendicular to the first ridge.

2. The stabilization device of claim 1, wherein distal tips of the actuators push respective ends of the target object around the first ridge of the stabilization device.

3. The stabilization device of claim 1, wherein distal tips of the actuators push at least a portion of the target object into the first ridge.

4. The stabilization device of claim 1, further comprising a third ridge extending parallel to the first ridge.

5. The stabilization device of claim 1, wherein the second ridge is one of a plurality of perpendicular extending second ridges positioned so that gaps are formed between the second ridges, the first and second robotic actuators configured to push the target object into the gaps to distribute material included in the target object into the gaps.

6. The stabilization device of claim 1, further comprising a third robotic actuator, and wherein the palm region comprises a space on the end effector base between the three robotic actuators into which the actuators extend when deployed.

7. A method comprising:
affixing the stabilization device of claim 1 to the robotic end effector; and
actuating the first and second robotic actuators to grasp the target object between the robotic actuators and the first ridge.

8. The method of claim 7, further comprising providing soft robotic actuators as the robotic actuators.

9. The method of claim 8, further comprising inflating the soft robotic actuators to a pressure of 9-13 pounds per square inch (PSI).

10. The method of claim 7, further comprising positioning the robotic end effector so that a long axis of the first ridge of the stabilization device aligns with a long axis of the target object.

11. The method of claim 10, further comprising reverse-actuating the first and second robotic actuators prior to moving the stabilization device into position.

12. The method of claim 7, further comprising moving the stabilization device into contact with the target object before actuating the actuators.

13. The method of claim 7, further comprising moving the stabilization device so that the stabilization device is spaced away from the target object but within a predetermined distance range prior to actuating the actuators.

14. The method of claim 7, further comprising translating or rotating the robotic end effector while grasping the target object, the translating or rotating pushing the target object into the first ridge of the stabilization device.

* * * * *

UNITED STATES PATENT AND TRADEMARK OFFICE
CERTIFICATE OF CORRECTION

PATENT NO. : 10,668,629 B2
APPLICATION NO. : 15/967210
DATED : June 2, 2020
INVENTOR(S) : Jeffrey Curhan et al.

Page 1 of 1

It is certified that error appears in the above-identified patent and that said Letters Patent is hereby corrected as shown below:

In the Claims

In Column 14, Line 63, remove "base"

Signed and Sealed this
Eighteenth Day of August, 2020

Andrei Iancu
*Director of the United States Patent and Trademark Office*